United States Patent
Mantell

(10) Patent No.: US 6,666,605 B2
(45) Date of Patent: Dec. 23, 2003

(54) METHOD FOR IMPROVED SECURITY IN THE HANDLING OF PRINTER BIN OUTPUT

(75) Inventor: David A. Mantell, Rochester, NY (US)

(73) Assignee: Xerox Corporation, Stamford, CT (US)

(*) Notice: Subject to any disclaimer, the term of this patent is extended or adjusted under 35 U.S.C. 154(b) by 183 days.

(21) Appl. No.: 09/742,942

(22) Filed: Dec. 20, 2000

(65) Prior Publication Data

US 2002/0076252 A1 Jun. 20, 2002

(51) Int. Cl.⁷ .................................................. B65H 7/04
(52) U.S. Cl. .................................. 400/708; 347/262
(58) Field of Search ............................ 400/707.1, 708, 400/708.1, 703, 582; 271/297, 298, 3.15, 3.17, 258.01, 259, 176; 347/262

(56) References Cited

U.S. PATENT DOCUMENTS

| | | | | |
|---|---|---|---|---|
| 4,211,483 A | | 7/1980 | Hannigan et al. | 355/14 R |
| 4,728,963 A | | 3/1988 | Rasmussen et al. | 346/25 |
| 4,757,348 A | | 7/1988 | Rourke et al. | 355/6 |
| 4,970,554 A | | 11/1990 | Rourke | 355/202 |
| 5,169,249 A | * | 12/1992 | Kitabata | 400/582 |
| 5,270,773 A | | 12/1993 | Sklut et al. | 355/201 |
| 5,308,058 A | | 5/1994 | Mandel et al. | 271/297 |
| 5,316,279 A | | 5/1994 | Corona et al. | 270/1.1 |
| 5,475,403 A | * | 12/1995 | Havlovick et al. | 705/33 |
| 5,547,178 A | | 8/1996 | Costello | 270/52.02 |
| 5,644,685 A | | 7/1997 | Baehr | 395/111 |
| 5,645,396 A | * | 7/1997 | Romanowski | 414/789.9 |
| 5,697,761 A | * | 12/1997 | Morgan et al. | 414/790.3 |
| 5,709,374 A | | 1/1998 | Taylor et al. | 270/1.02 |
| 5,752,697 A | | 5/1998 | Mandel et al. | 271/288 |
| 5,823,529 A | * | 10/1998 | Mandel et al. | 271/296 |
| 5,842,826 A | * | 12/1998 | Owen et al. | 414/789.9 |
| 5,970,228 A | * | 10/1999 | Nezu | 713/200 |
| 6,040,923 A | * | 3/2000 | Takashimizu et al. | 358/498 |
| 6,075,617 A | | 6/2000 | Fischer et al. | 358/1.16 |
| 6,257,784 B1 | * | 7/2001 | Mantell | 400/578 |
| 6,259,468 B1 | * | 7/2001 | Higuchi | 347/262 |
| 6,308,173 B1 | * | 10/2001 | Glasser et al. | 707/9 |
| 6,409,043 B1 | * | 6/2002 | Fujita et al. | 271/10.03 |

* cited by examiner

Primary Examiner—Stephen R. Funk
(74) Attorney, Agent, or Firm—Christopher D. Wait

(57) ABSTRACT

A method for improving security with a printer and sensitive hardcopy output. The method comprises examining incoming print jobs for indication of sensitivity and need for increased security. Any such identified job when printed is monitored. This monitoring is accomplished by watching a sensor provided on the output bin. When the identified job is removed from the printer a message is sent to the originator of the print job with a time stamp indicating that the hardcopy output has been removed.

20 Claims, 4 Drawing Sheets

METHOD FOR IMPROVED SECURITY IN THE HANDLING OF PRINTER BIN OUTPUT

BACKGROUND OF THE INVENTION AND MATERIAL DISCLOSURE STATEMENT

The present invention relates to a methodology for improving the security in the handling of print job output. In particular, the present invention relates to when a shared printer places security sensitive printout in the output bin.

Sharing of resources has become an integral part of the typical day-to-day business operations scenario. In particular, printers of greater cost and which offer such attributes as higher speed, better resolution or color are shared. However, this means that the printed hardcopy output in the shared resource is often provided in a limited number of output bins or even just a single output bin. Most printers designed for resource sharing accommodate this problem in a few ways. Security for sensitive printout is a concern for all of them.

If there is but one output bin the printer will typically skew or offset entire print jobs from each other. Often a banner or header page is inserted as a separator sheet between the print jobs in order to differentiate one job from another. Examples of this are found in U.S. Pat. No. 4,211,483 to Hannigan et al., U.S. Pat. No. 5,316,279 to Corona et al., and U.S. Pat. No. 5,709,374 to Taylor et al., which are herein incorporated by reference in their entirety for their teaching. With the sharing of this type of printer resource, there comes an inevitable increase in the misplacement of print jobs which must be endured. However, for those occasions requiring security where a sensitive print is generated this may be intolerable.

If there is more than one output bin dedicated then lockable bins may be used to provide greater security. Discussion of such systems and their limitations and technology may be found in U.S. Pat. No. 5,270,773 to Sklut et al., U.S. Pat. No. 5,308,058 to Mandel et al., and U.S. Pat. No. 5,752,697 also to Mandel et al. which are herein incorporated by reference in their entirety for their teaching. While such systems may notify the originator that their print job has completed, or of problems with their hardcopy output, such systems fail to notify the originator that successfully printed hardcopy of security sensitive documents have been removed from the output bin. Such immediate feedback would greatly improve tracking and the securing of sensitive documents for the minimum of cost compared with other systems.

Therefore, as discussed above there exists a need for a methodology which will solve the problem improving the security for sensitive documents and hardcopy. Thus, it would be desirable to solve this and other deficiencies and disadvantages with an improved methodology.

SUMMARY OF THE INVENTION

The present invention relates to a method for a shared printer to provide increased security for a print job in its output bin to a print job originator, comprising outputting a print job to the output bin. This is followed by monitoring the output bin for removal of the print job, and signaling the print job originator when the print job is removed from the output bin.

More particularly, the present invention relates to a method for a LAN connected printer to provide increased security for a print job in its output bin to a print job originator, comprising outputting a print job to the output bin. This is followed by monitoring a sensor in the output bin for removal of the print job, and signaling the print job originator over the LAN when the print job is removed from the output bin.

The present invention more particularly relates to a method for a LAN connected printer to provide increased security for a print job in its output bin to a print job originator, comprising examining the print job for a security indicator. This is followed by outputting the print job to the output bin and if the security indicator labeled the print job as sensitive monitoring a sensor in the output bin for removal of the print job. Then signaling the print job originator over the LAN when the print job is removed from the output bin.

DESCRIPTION OF THE INVENTION

Figure 1:
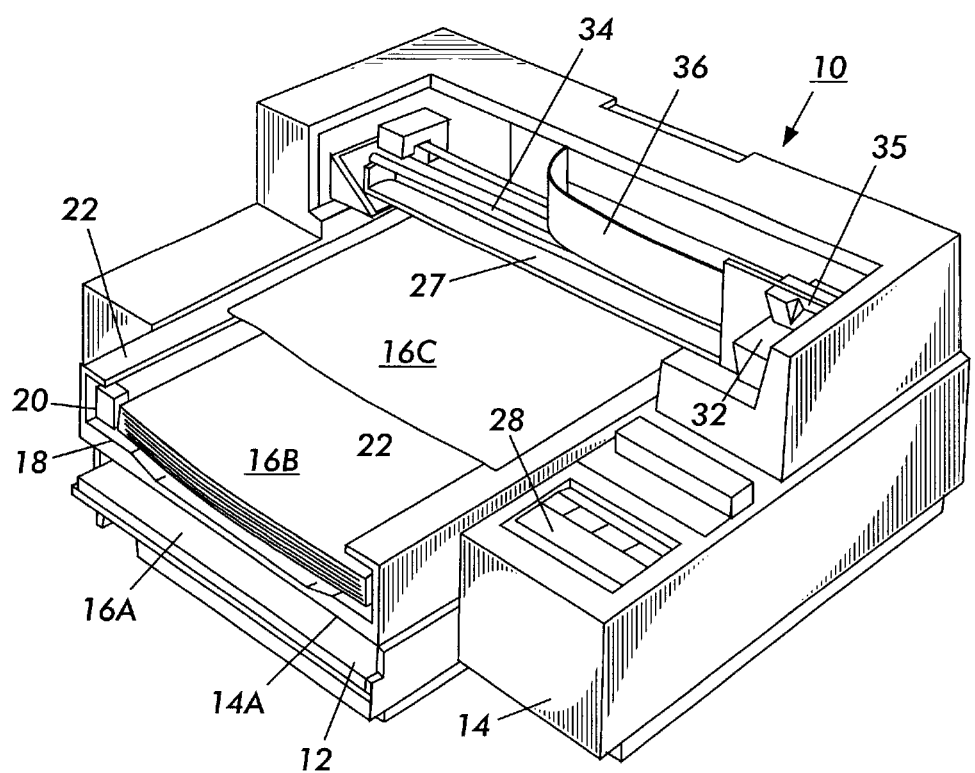
FIG. 1 depicts a typical printer with a output bin sensor.

FIG. 1 provides an ink jet printer 10. There, it will be observed that a paper input or supply tray 12 is provided in the front, or user-facing portion, 14 of the printer 10. The paper input tray 12 is configured to handle a substantial quantity of paper 16a or other medium for printing thereon. Also in the front 14 of the printer 10 is provided a paper output or collection tray 18. The paper output tray 18 is also configured to handle a substantial quantity of paper 16b.

There are two features to be noticed with regard to the paper output tray 18. First, an output bin sensor 20 is provided near the rear of the paper output tray 18. Sensor 20 is provided for indication of whether the user has removed the previous page or output paper 16b. The operation of sensor 20 may be based for example upon sensing weight, light scattering or light reflectance effects from when paper 16b is present or not in collection tray bin 18. In a preferred embodiment, an inexpensive simple LED detector pair is used that can detect either a reflectance or a scattering signal. Thus both transparencies and paper can be detected. Many other arrangements will be conceivable to those skilled in the art and as such are considered within the gambit of the present invention. It should be noted for instance that there are many arrangements for providing this sensor functionality including its placement location in the output bin. For example, many printer systems already have a sensor provided at the output for the purpose of tracking paper jams. Such arrangements may be utilized with the present invention with little or even no modification as would be evident to one skilled in the art.

Second, a pair of opposed output rails 22 is provided above the output tray 18. These output rails 22 along with the platen (not visible in this view) support a sheet of paper 16c during the printing operation to permit the ink on the sheet 16b underneath to dry. At the end of the printing cycle, when the sheet 16c is near the front 14a of the paper output tray 18, the platen pivots down, eliminating the clamping of the sheet between the platen and paper guide 27. The sheet 16c then drops into the paper output tray of its own weight.

Up until the completion of the printing cycle, the rear end of the paper is supported by the paper drive roller and the platen.

The front portion 14 of the printer 10 is also provided with a control panel 28, which is electrically associated with a microprocessor/controller 200 (FIG. 2) for selection of various options relating to the printing operation. Such control operations, provided by presently-available microprocessors, are well-known in the prior art.

Also shown in FIG. 1 is a printhead carriage 35, which travels on a guide rail 34 and paper guide 27, and printhead 32 which is connected by a flexible electrical flat ribbon 36 to the microprocessor/controller 200. The microprocessor/controller 200 controls a motor, which provides movement of the printhead carriage 35. The printhead 32 is specifically designed for this ink-jet printer, and utilizes thermal ink-jet printing technology. However, the printer could operate with other ink-jet printheads if the printhead carriage interfaces are compatible, or with other carriage configurations. Further, reconfiguration of the printhead carriage 32 would permit the use of other ink-jet technologies, such as piezo-electric. Such reconfiguration is within the capabilities of one skilled in the art.

It should be noted that while the above preferred embodiment printer is an ink jet type, that an alternative equally preferred embodiment includes a laser type printer. Further as will be apparent to those skilled in the art, the techniques taught here in the present invention will be applicable to many types of hardcopy output devices.

Figure 2:
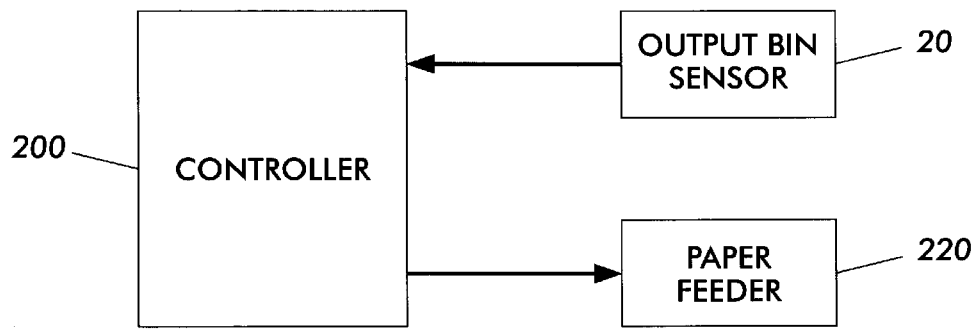
FIG. 2 shows schematic block diagram of a possible hardware configuration for the present invention.

FIG. 2 provides a concise schematical representation of a preferred embodiment. Controller 200 is coupled with output bin sensor 20 as well as paper feeder 220. In a preferred embodiment controller 200 polls for an indicator from sensor 20. Of course during this polling time the print job originator or someone responsible for monitoring sensitive print jobs may be reminded that the job has not yet been removed from the output bin. When sensor 20 indicates that the printout has been removed from the output bin, the controller 200 executes a decision to end a loop and proceed directly to the printing of the new print job if any. As such the controller 200 may now notify the print job originator that the job has been removed from the output bin.

In an alternative embodiment, the signal indication of printout removal from output bin by sensor 20 is handled by the controller 200 as an interrupt. Those skilled in the art will understand what software changes are necessary for that scenario. Indeed, there are many other hardware and software specifics which will yield the same result, including for example custom logic circuits (ASIC FPGA, etc.) dedicated to implementing the logic flow discussed below.

Figure 3:
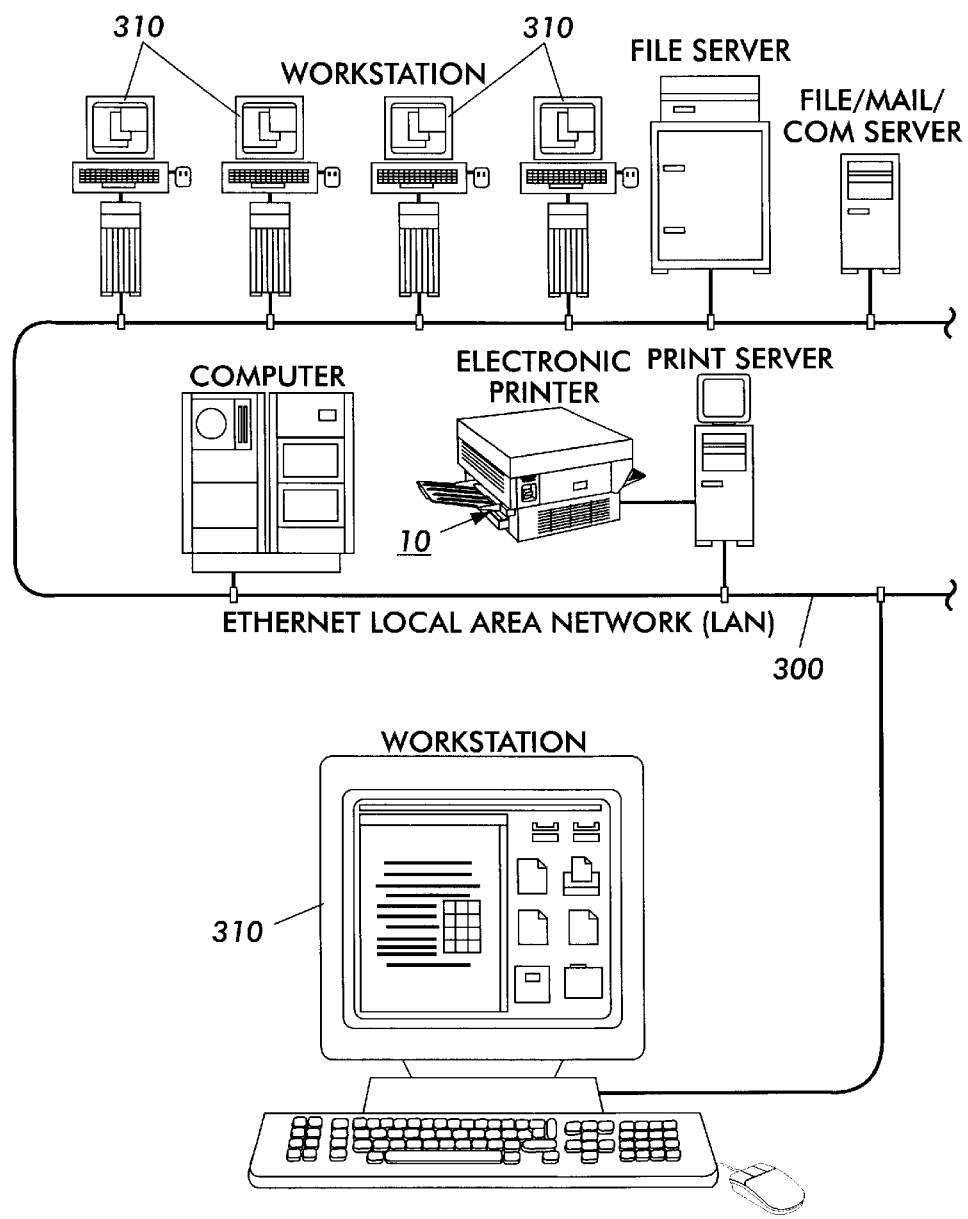
FIG. 3 shows a typical local area network configuration depicting workstations and shared resources including another type of typical printer.

In FIG. 3, merely by way of an example, the exemplary shared user electronic printer 10 is shown connected into a conventional prior art inner-office or interoffice system electronic local area network (LAN) 300 with various remote user terminals (workstations) 310, one of which is shown here in an enlarged view. Some other possible typical network system components are also illustrated and labeled.

Figure 4:
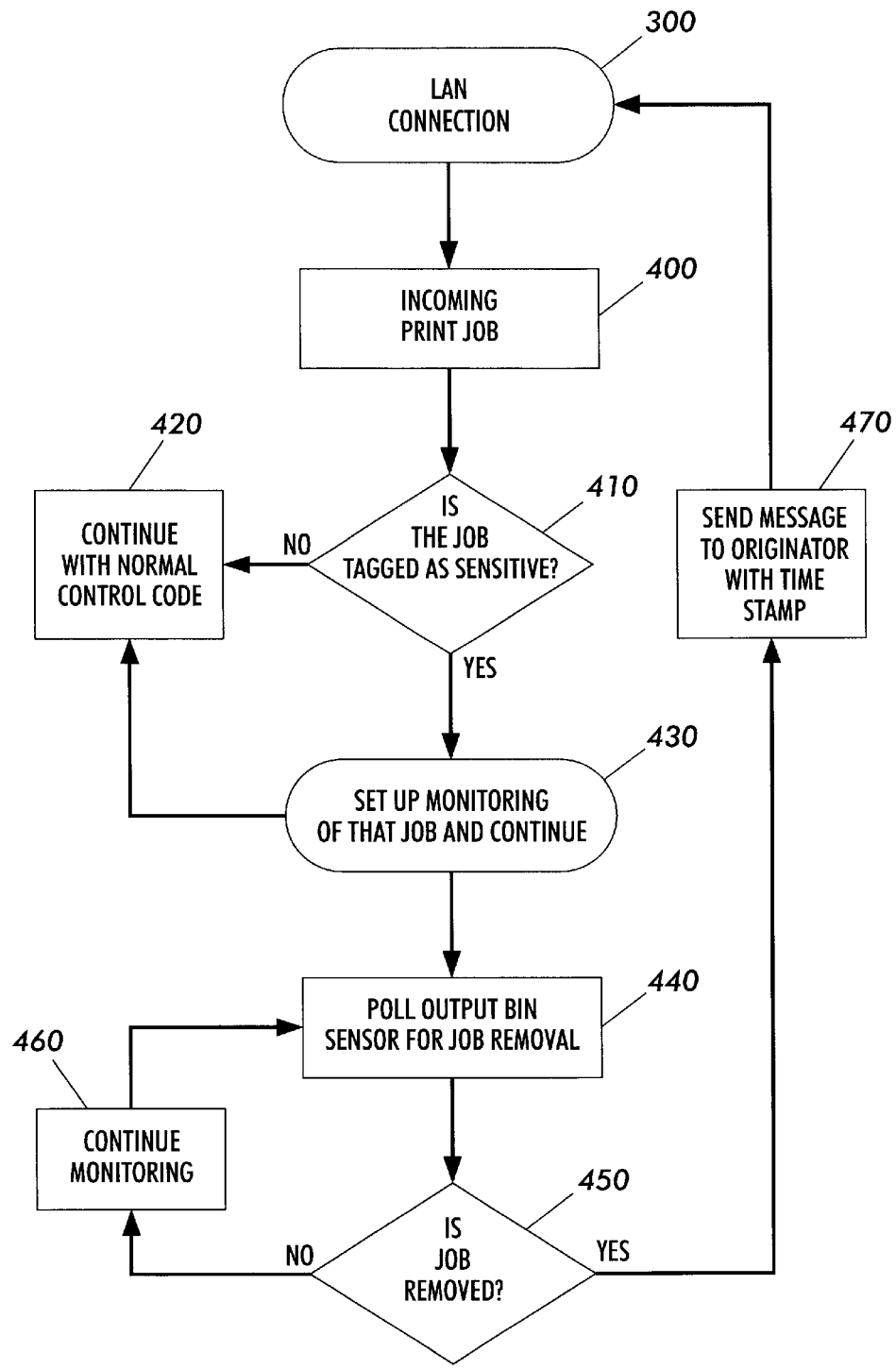
FIG. 4 depicts a flow chart for the present invention which makes allowance for an output bin sensor.

A preferred embodiment is depicted with FIG. 4. In this arrangement the printer 10 is connected to a local area network (LAN) 300 and receives print jobs from there. Printer 10 may be ink jet as above, or any type of printer suitable for connection to a LAN 300 and the handling of multi-page print jobs such as for example a laser printer or other electrostatic-graphic type. At instruction block 400 an incoming print job from the LAN is received. Decision block 410 is where after examination of the print job for a tag or header or other identifier to indicate that the job is deemed sensitive, the decision is made to monitor output bin hardcopy removal.

Such detection of identifiers is well known in the art. The disclosed embodiment feature of a security identifiers or secure job designator may utilize existing security access designator codes entered by the user on the user's PC or other terminal on which the document is generated or edited. That code may be in one of the well-known page description languages (PDL), such as Interpress.™., POSTSCRIPT®, Quickdraw.™., or other well-known network and/or page description languages noted in Col. 17 of said U.S. Pat. No. 5,308,058 and elsewhere, and it may be on an electronic "job ticket" or job control sheet such as disclosed in U.S. Pat. Nos. 4,970,554or 4,757,348. For example, it is known to put codes or subroutine operating instructions in the "comments" section of PDL document descriptors which are stripped out as soon as the electronic document is received by the printer for controlling queuing or printing functions.

If the decision result in block 410 is "no" then program control is returned to the normal software or logic subroutines as indicated by block 420. However, if the decision result is "yes" then there is a branch to setup monitoring of that job as shown by block 430. That monitoring subroutine will in a preferred embodiment poll the bin sensor 20 for job removal as indicated at block 440. Decision block 450 directs the logic flow depending upon the polling results. If the job has not been removed from the output bin then the monitoring continues in a loop as depicted with block 460. In the alternative if the job has been removed from the output bin then a send message to originator command is executed as shown at block 470. The message sent over LAN 300 has preferably sent along with it with a time stamp.

In a preferred embodiment it may be most appropriate to notify another person other than the originator after a finite period of time has gone by without removal of the security sensitive hardcopy from the output bin. That individual could be a designated backup person or it may be a security officer or post. The time interval may vary depending on the requirements and sensibilities of the office or organization in which the printer is used. This could mean that five to ten minutes must transpire, or it may mean a half hour or more. It may also be keyed to a particular time of day, such as a five o'clock quitting time.

It may also be preferred to have the system record pertinent job information. This information may include such particulars as the originators information (name, ID, etc.), the time submitted, printed, and removed from the output bin, plus any notice sent to another, and so on, as will be apparent to those skilled in the art. This can be an important security aid in tracking of and providing accountability for the print job.

In one preferred embodiment, the printout of subsequent print jobs is halted until the sensitive hardcopy is picked up. However, there are a number of circumstances in which a printer could continue to print a finite number of jobs prior to removal of the sensitive job. If a subsequent job in the queue is also a sensitive job by the same user then that job should also be printed. In a printer that offsets jobs in the output tray, multiple jobs may be printed as long as the output bin detector is able to detect the presence of the sensitive job. For an output bin sensor which resolves the position and height of the pile in the output tray, removal of a job from the middle of the stack may be accommodated. Nonetheless, it may be preferable from the standpoint of certainty, that the printer halt all other printing until the sensitive job is removed. Consequently the number of jobs printed after a sensitive job may be adapted to account for the level of hardware configuration available and the level of security certainty required.

In summary, practicing the methodology of the present invention provides increased security. By providing a sensor at the output bin or making use of one already there, intelligence may be provided with a small amount of additional code in the controller. This allows for an end user, if a sensitive document is sent for printout, to monitor for removal of that document from the output bin. Obviously the expectation is that the originator will be the one to remove the document, and any indication that this has not happened will put the originator on the alert.

While the embodiment disclosed herein is preferred, it will be appreciated from this teaching that various alternative, modifications, variations or improvements therein may be made by those skilled in the art, which are intended to be encompassed by the following claims:

What is claimed:

1. A method for a shared printer to provide increased security for a print job in its output bin to a print job originator, comprising:

outputting a print job to the output bin;

monitoring the output bin for removal of the print job when the print job is identified as sensitive; and, signaling the print job originator when the print job is removed from the output bin.

2. The method of claim 1 wherein the printer is connected to a local area network.

3. The method of claim 2 wherein the step of monitoring is accomplished by monitoring a sensor in the output bin.

4. The method of claim 3 wherein the signaling step includes providing a time stamp to the originator.

5. The method of claim 3 wherein the sensor is an LED pair type.

6. The method of claim 3 wherein the sensor is a weight sensitive type.

7. A method for a LAN connected printer to provide increased security for a print job in its output bin to a print job originator, comprising:

outputting a print job to the output bin;

monitoring a sensor in the output bin for removal of the print job when the print job is identified as sensitive; and, signaling the print job originator over the LAN when the print job is removed from the output bin.

8. The method of claim 7 wherein the signaling step includes providing a time stamp to the originator.

9. The method of claim 8 wherein the sensor is a LED pair type.

10. The method of claim 9 wherein the sensor senses the scattering of light.

11. The method of claim 9 wherein the sensor senses the reflection of light.

12. The method of claim 9 wherein the sensor senses the absorption of light.

13. A method for a LAN connected printer to provide increased security for a print job in its output bin to a print job originator, comprising:

examining the print job for a security indicator;

outputting the print job to the output bin and if the security indicator labeled the print job as sensitive;

monitoring a sensor in the output bin for removal of the print job; and, signaling the print job originator over the LAN when the print job is removed from the output bin.

14. The method of claim 13 wherein the monitoring of the print job being removed from the output bin is accomplished by polling the sensor.

15. The method of claim 13 wherein the monitoring of the print job being removed from the output bin is accomplished by handling an interrupt from the sensor.

16. The method of claim 13 wherein the signaling step includes providing a time stamp to the originator.

17. The method of claim 13 wherein the sensor is an LED pair type.

18. The method of claim 14 wherein the sensor is a weight sensitive type.

19. The method of claim 13 further comprising the step of:

notifying someone other than the originator if after a finite period of time the print job has not been removed from the output bin.

20. The method of claim 19 further comprising the step of:

recording the print job information, comprising such particulars as the originator, print job completion time, and the time at which the print job is removed from the output bin.

* * * * *